United States Patent [19]

Schultz

[11] Patent Number: 4,711,187
[45] Date of Patent: Dec. 8, 1987

[54] FERTILIZER APPLICATOR KNIFE AND ITS USE

[76] Inventor: Daryl Schultz, R.R. 2, Box 92-A, Rensslaer, Ind. 47979

[21] Appl. No.: 779,014

[22] Filed: Sep. 23, 1985

[51] Int. Cl.$^4$ .................................... A01C 23/02
[52] U.S. Cl. ................................ 111/7; 172/699; 172/747
[58] Field of Search ............... 172/699, 747, 700, 719; 111/6, 7

[56] References Cited

U.S. PATENT DOCUMENTS

| | | | |
|---|---|---|---|
| 2,684,617 | 7/1954 | Johnston | 172/699 |
| 3,188,989 | 6/1965 | Johnston | 111/7 |
| 3,439,636 | 4/1969 | Lemke | 111/7 |
| 4,132,181 | 1/1979 | Smith | 111/7 |
| 4,201,142 | 5/1980 | Stump | 111/7 |
| 4,262,751 | 4/1981 | Grear | 172/699 |
| 4,269,274 | 5/1981 | Robertson | 172/699 |
| 4,326,592 | 4/1982 | Stephenson | 172/747 |

FOREIGN PATENT DOCUMENTS

| | | | |
|---|---|---|---|
| 2527894 | 12/1983 | France | 172/747 |
| 1179930 | 2/1970 | United Kingdom | 111/7 |

OTHER PUBLICATIONS

Adams Tillage Tools-Advertizing brochure of Adams Hard-Facing Co. Inc., Guymon D. K., p. 16.

Primary Examiner—Richard J. Johnson
Attorney, Agent, or Firm—Finnegan, Henderson, Farabow, Garrett, & Dunner

[57] ABSTRACT

A fertilizer knife for subsurface application of fertilizer in liquid or vapor form in a ground furrow comprises a narrow, elongated blade having a width $W_1$, a leading edge with a soil breaking segment and a trailing edge. An elongated, hollow, fertilizer conduit having a width $W_2$ is located behind the trailing edge and is shaped to correspond to the trailing edge. A foot portion on the blade has a bottom edge extending from the leading edge upwardly toward and beyond the trailing edge to form a rearwardly extending shoulder. The conduit terminates above and is spaced from the shoulder to prevent back pressure in the conduit during movement of the knife through the furrow and to provide for flow of fertilizer away from vertical walls of the furrow. A hard, abrasion-resistant material over the soil-breaking segment forms a substantially flat surface having a width $W_3$ on the leading edge. Soil contacting surfaces on the blade and conduit are covered by a dried, abrasion-resistant coating. The elements are dimensioned such that $W_1 \geqq W_2$ and $W_3 > W_1$.

23 Claims, 8 Drawing Figures

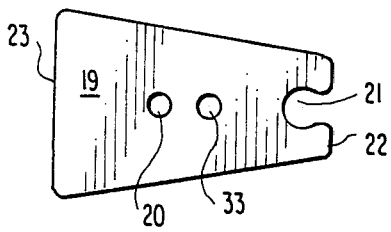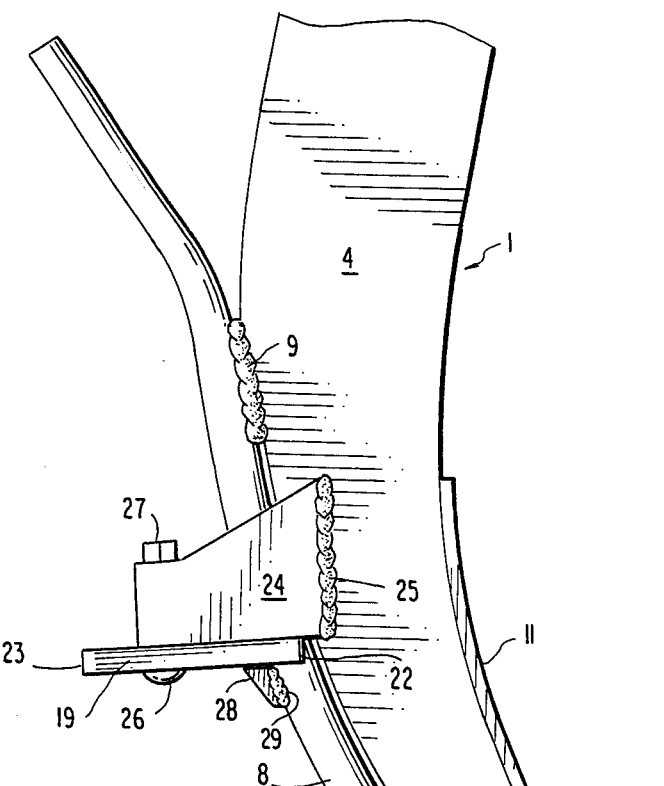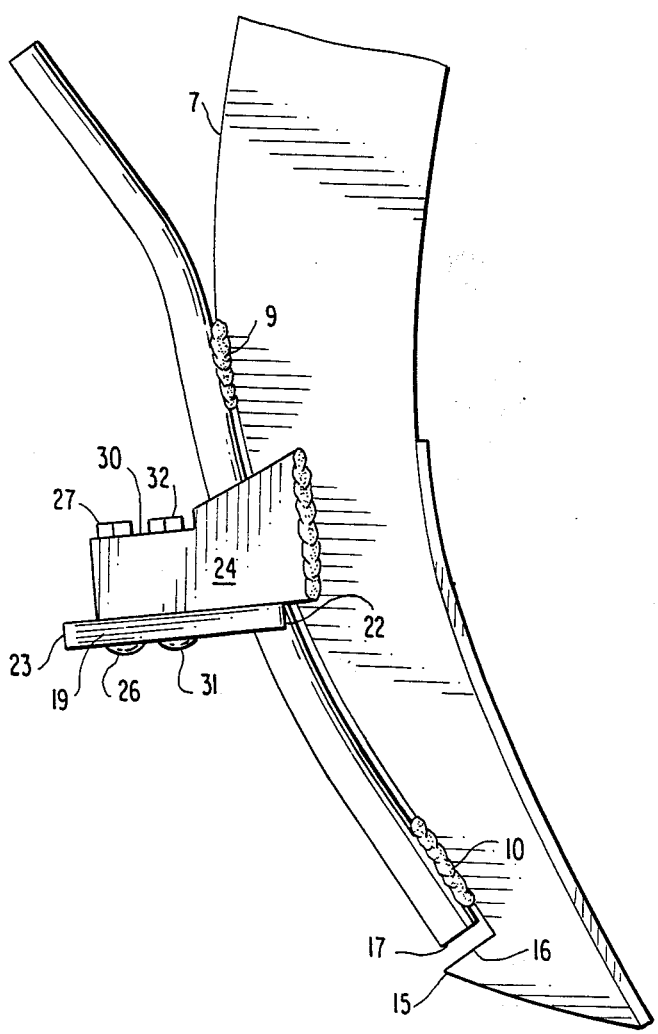

4,711,187

FERTILIZER APPLICATOR KNIFE AND ITS USE

BACKGROUND OF THE INVENTION

This invention relates to a non-rotary tool for injecting a fluid fertilizer composition, such as anhydrous ammonia, into a furrow in the ground. More particularly, this invention relates to a fertilizer knife for preparing a furrow in the ground and for directing the fertilizer into the furrow below ground level.

The application of liquid fertilizer over the surface of the ground has been known for many years, but has been found to be unsatisfactory because the fertilizer penetrates the surface of the soil relatively slowly resulting in part of the fertilizer evaporating before it is taken up by the soil. Subsequent rainfall washes much of the remaining fertilizer away. To overcome these problems, deep placement of liquid fertilizer has been carried out and has been found to be beneficial to plant growth.

Earth penetrating tools and applicator blades have been devised for distributing liquid fertilizer in a desired pattern at various depths below the surface of the soil. Fertilizer distributors of this type have one or more cultivator blades that are drawn through the soil by a tractor. Each blade is provided with a tube extending down the rearward edge for conducting the liquid fertilizer to the lower end of the blade for injection in the soil. The blades are usually provided with a supporting shank secured to a lift-type cultivator drawbar.

Liquid anhydrous ammonia injected into the ground is normally maintained under pressure, and the ammonia reverts to a vapor state upon release of the pressure during application. Conversion of the liquid anhydrous ammonia into a vapor usually occurs very readily during the time of year when the fertilizer is applied—namely, during fairly warm weather. Since the anhydrous ammonia may escape from the furrow before being absorbed into the ground, the applicator blade must be designed so that the loss of fertilizer through vaporization is minimized.

Certain portions of the fertilizer applicator blade wear very rapidly while the main body of the blade remains in good condition. For example, the fertilizer knife has a leading edge that opens the furrow in the soil. This edge is subject to great wear and early failure caused by the abrading action of the soil and by impact with objects, such as roots and stones. Early failure of the fertilizer tube on the rear of the blade may also occur because the tube usually has relatively thin side walls that are subject to soil abrasion. Thus, the design of the applicator blade should be such that accelerated wear on portions of the blade is minimized.

Moreover, it is well understood by workers in the field that even a fertilizer applicator blade of the best design will wear and must eventually be reconditioned. In these circumstances it is important that the earth-engaging and contacting surfaces be capable of being easily removed and replaced or restored with a minimum of effort and expense.

There exists a need in the art for a fertilizer applicator knife capable of fulfilling the requirements of use with fluid fertilizers, such as anhydrous ammonia. The fertilizer knife should be designed to ensure absorption of the anhydrous ammonia in the soil without the escape of vapor from the furrow. The fertilizer knife should also be resistant to wear on all its operating surfaces and be capable of being reconditioned quickly and easily by removing and replacing or restoring worn surfaces.

SUMMARY OF THE INVENTION

Accordingly, this invention aids in fulfilling these needs in the art by providing a fertilizer knife for subsurface application of fertilizer in liquid or vapor form in a ground furrow. The fertilizer knife of the invention comprises narrow, elongated blade means having a width $W_1$, a leading edge with a soil-breaking segment and a trailing edge. The fertilizer knife includes an elongated, hollow, fertilizer conduit means having a width $W_2$ wherein the conduit means is behind the trailing edge and is shaped to correspond to the trailing edge. A foot portion on the blade has a bottom edge extending from the leading edge upwardly toward and beyond the trailing edge to form a rearwardly extending shoulder means with the trailing edge. The conduit means terminates above and is spaced from the shoulder means to prevent back pressure in the conduit during movement of the knife through the furrow and to direct flow of the fertilizer away from the vertical walls of the furrow. A hard, abrasion-resistant material over the soil-breaking segment forms a substantially flat surface having a width $W_3$ on the leading edge. The blade and conduit have soil-contacting surfaces that are covered by a dried, abrasion-resistant coating. The fertilizer knife of the invention is dimensioned so that $W_1 \geqq W_2$ and $W_3 > W_1$.

This invention also provides a method for preparing a furrow in the ground and for directing fertilizer into the furrow below ground level using the fertilizer knife of this invention.

The fertilizer applicator knife of the invention is especially useful for forming a furrow in the ground and for placing and dispersing anhydrous ammonia in the furrow for direct and immediate contact with the ground. It will be apparent from the following discussion that the knife of the invention is designed to ensure absorption of anhydrous ammonia in the soil without the escape of vapor from the furrow. The knife is resistant to wear on all of its operating surfaces. In addition, the knife can be reconditioned quickly and easily by removing and replacing or restoring worn surfaces.

BRIEF DESCRIPTION OF THE DRAWINGS

This invention will be more readily understood from the following description and the drawings in which:

FIG. 4 shows a fertilizer knife of the invention fitted with a soil sealer for closing and packing the furrow;

FIG. 5 is a top view of the soil sealer in FIG. 4 removed from the fertilizer knife;

FIG. 6 depicts another embodiment of the fertilizer knife provided with a soil sealer;

DETAILED DESCRIPTION

The fertilizer knife of this invention is drawn behind a tractor or other powered agricultural machine to form a narrow furrow or trench in cultivated soil. The furrow created by the knife is typically about ⅜ to about ⅝ inch wide and about 6 to about 10 inches deep, preferably about 8 to about 10 inches deep.

Fertilizer is deposited near the bottom of the furrow in liquid or vapor form to be absorbed into the soil. The fertilizer is a substance that is a vapor under standard conditions, i.e. at about 72° F. and 1 atmosphere pressure. Anhydrous ammonia is the most common fertilizer material having these properties and is the preferred fertilizer for use in the invention. Anhydrous ammonia can be maintained in a liquid state by storing the liquid at an elevated pressure.

Figure 1:
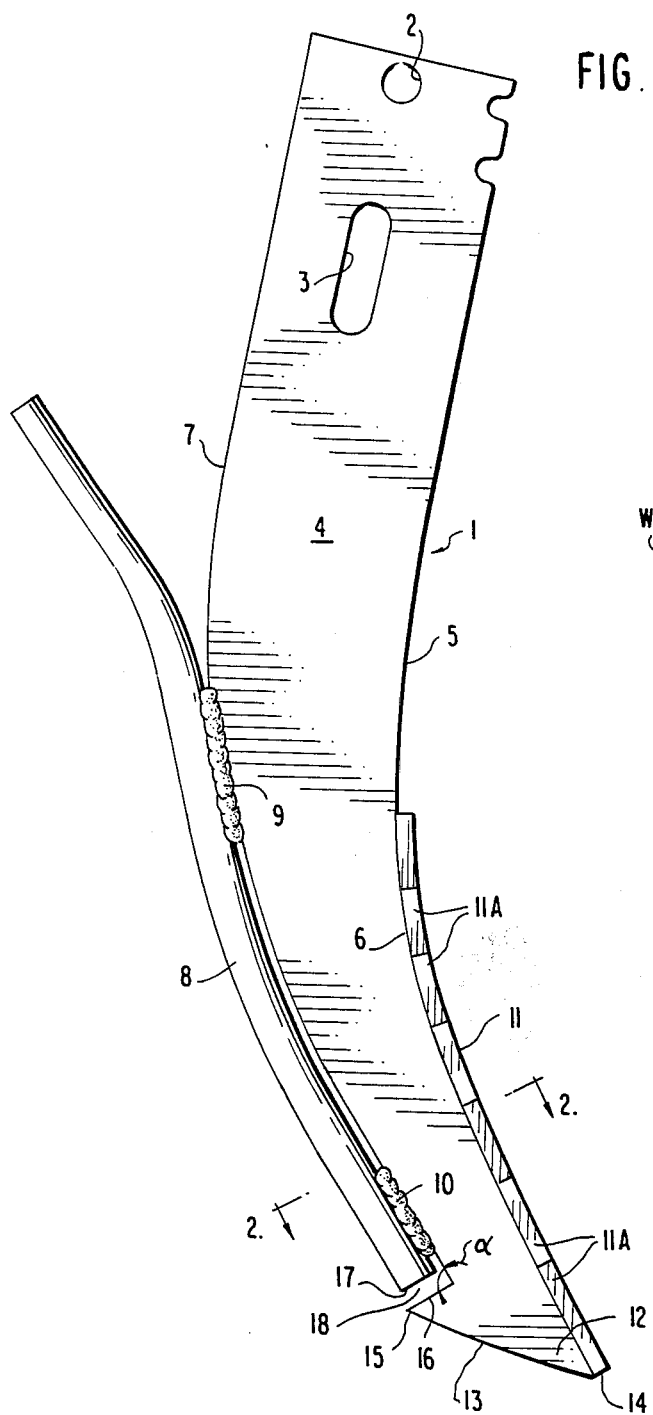
FIG. 1 is a side view of a fertilizer knife of the invention.

Referring to FIG. 1, a fertilizer knife of the invention is generally designated as 1. The fertilizer knife has a round hole 2 and a slotted opening 3 for attachment to a mounting bracket (not shown) fitted to the drawbar of a cultivator mounted on a tractor or for direct attachment to the drawbar. A nut and bolt, a bolt and cotter pin or a spring clip assembly can be employed to secure the knife to the bracket.

Fertilizer knife 1 is comprised of a blade 4 having a leading or front edge 5, a soil-breaking segment 6 coincident with a portion of the leading edge 5 and a trailing or rear edge 7. The leading edge 5 and the trailing edge 7 can be either straight or arcuate, independent of each other. Also, the leading edge 5 and trailing edge 7 can be parallel or non-parallel to each other. The blade means 4 is a solid, rigid shank typically formed from mild steel or high carbon steel. The shank can also be formed of an abrasion resistant tool steel or a hardened steel containing tungsten, vanadium, cobalt or mixtures of these elements, but lower cost steels, such as tempered spring steel, are preferred. In order to minimize cost and simplify fabrication, blade 4 is usually of substantially uniform width (i.e., width $W_1$ as described hereinafter). The width is typically about ⅜ to about ⅞ inch from side to side.

The fertilizer knife shown in FIG. 1 includes at least one elongated, hollow, fertilizer conduit, such as tube 8, behind to the trailing edge 7 of the blade 4. The fertilizer conduit 8 is shaped to correspond to the contour of the trailing edge 7 and is attached, such as by welds 9 and 10, to the blade 4 in FIG. 1. It will be readily understood by those skilled in the art that conventional means will be provided for supplying anhydrous ammonia under a controlled pressure and rate through a flexible supply tube connected to fertilizer conduit 8. It will also be understood that more than one conduit 8, such as one for vapor and one for liquid fertilizer, can be employed.

When the leading edge 5 is arcuate, the blade 4 can either form a front swept knife or a back swept knife. Fertilizer knives with front sweep are depicted in the Figures. A back swept knife is formed when the leading edge 5 is convex instead of concave (as shown in the Figures).

It has been found to be advantageous to taper the depth of the knife from top to bottom. As used herein, the term "depth of the knife" means the horizontal distance between the leading edge and the trailing edge when the knife is in operating position. In the case of a front swept knife, the taper will typically be from about 2¾ inches to about 3 inches at the top of the knife to about 1 inch to about 1½ inches at the bottom of the knife. In the case of a back swept knife, the taper will typically be from about 2¾ to 3 inches at the top to about 1¼ to 1¾ inches at the bottom. Tapering the blade in this manner results in the fertilizer conduit 8 being closer to the leading edge 5 in the furrow as compared to the portion of the knife above the furrow. During normal operation, the knife has a tendency to rotate slightly about its vertical axis thus forcing the fertilizer conduit against the sidewalls of the furrow and abrading the conduit. By tapering the knife so that the conduit is close to the leading edge of the knife in the furrow, wear on the conduit is reduced if the blade slightly rotates.

A layer 11 of hard, abrasion resistant material, is provided over the soil-breaking segment 6 of blade 4. The abrasion-resistant layer 11 protects the soil-breaking segment 6 from soil abrasion. Abrasion-resistant materials are well known in the art. A number of different metals can be employed in fabricating the fertilizer knife of the invention. A preferred abrasion-resistant metal is tungsten carbide. An abrasion-resistant metal having sufficient flexibility can be bent to follow the contour of the leading edge 5 and can be provided as a single piece. The abrasion resistant metal 11 can be rigidly secured to the soil-breaking segment 6 by means of a fusing or bonding material, such as solder, braze or weld, or by mechanical means, such as fasteners or by a tongue in groove arrangement.

When the fertilizer knife has an arcuate leading edge 5 of the type shown in FIG. 1, it has been found that a nonflexible, abrasion-resistant metal layer 11 can be secured to the soil-breaking segment 6 by soldering or brazing a multiplicity of short pieces 11A of abrasion-resistant metal to the soil-breaking segment taking care to butt each piece to adjoining pieces. This embodiment also makes it possible to easily remove and replace individual pieces that are worn or damaged without disturbing the remaining pieces. Repair expense is thereby minimized since the metal layer 11 comprises a substantial portion of the total cost of the knife. Preferably each piece 11A has dimensions that are substantially the same as dimensions of each of the other pieces 11A secured to the soil-breaking segment 6 in order to further simplify the repair task. Rigid tungsten carbide pieces of substantially rectangular shape and uniform thickness are preferred for this purpose.

The blade 4 terminates in a foot portion 12 of substantially the same thickness as the shank. The foot portion comprises a bottom edge 13 extending from the leading edge 5 upwardly toward the trailing edge 7. A knife point 14 is thereby formed on the blade. The knife point 14 facilitates initial penetration of the blade to the desired depth in the ground, especially when the ground is hard. This minimizes skating of the blade over the soil surface.

The upwardly extending bottom edge 13 terminates beyond the trailing edge 7 to form a rearwardly extending shoulder 15 having an upwardly facing top surface 16. The top surface 16 forms an angle ($\alpha$) of about 90° or more with the trailing edge 7. The top surface is substantially flat in FIG. 1 and the angle ($\alpha$) shown in the Figure is about 90°. The top surface thus forms an obtuse angle with the vertical when the fertilizer knife is in operating position.

Figure 2:
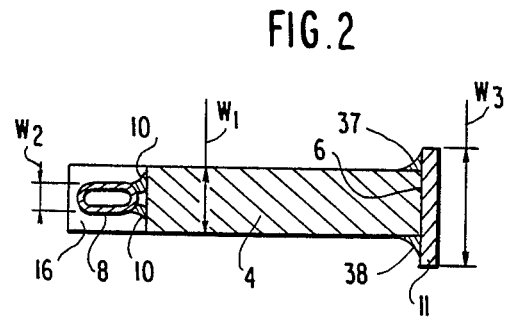
FIG. 2 is a view through section 2—2 in FIG. 1.

FIG. 2 is a view through section 2—2 in FIG. 1. The blade 4 is of substantially uniform thickness $W_1$ and the fertilizer conduit 8 has a width $W_2$. The hardened metal layer 11 is shown as having a width $W_3$. In the fertilizer knife of this invention, the components are dimensioned so that $W_1 \geq W_2$ and $W_3 > W_1$. As depicted in FIG. 2, $W_3 > W_1$ and $W_1 > W_2$. It has been found that the sidewalls of the fertilizer conduit 8 are subject to accelerated wear, and by making the width of the conduit less than the width of the elements that lead the conduit through the furrow, the sidewalls of conduit 8 are thereby protected during use.

Most of the fertilizer implements heretofore used embody a sharp edge along the leading edge 5 to facilitate passage of the knife through the soil. It has been observed that a bevelled or sharp knife edge is unsuitable when anhydrous ammonia is deposited in the soil because the edge tends to compact the soil against vertical side walls of the furrow making it difficult to close the furrow after the anhydrous ammonia is injected in the soil. It has been discovered that the abrasionresistant metal layer 11 over the soil-breaking segment 6 must form a substantially flat surface on the leading edge as shown in FIG. 2. The substantially flat, hard metal layer 11 avoids solid compaction and aids in maintaining loose soil conditions as the furrow is formed.

In the preferred embodiment of the invention previously described, flat pieces (11A in FIG. 1) of abrasion resistant material are attached to the surface of the soil-breaking segment 6. This embodiment is further described in FIG. 2. It has been discovered that pieces of metal are less likely to become detached from the blade when installed in this manner. Also, if a crack develops in the abrasion resistant material, the pieces will prevent the crack from propagating throughout the material. The pieces can be readily secured to the blade by placing them in contact with the flat surface of the soil-breaking segment 6, applying a thin solder ribbon, typically about 0.01 inch. each side of the blade 4 as shown as 37 and 38 in FIG. 2, and heating the resulting assembly in a furnace under conditions to cause the solder to melt and bond the metal pieces to the blade 4.

It is also advantageous to dimension the components so that the bonding material 37 and 38 is protected from abrasion by the soil. This can be achieved by making the width $W_3$ sufficiently large that the small bead of bonding material is located inwardly of the edges of the metal layer 11 as depicted in FIG. 2. Width $W_3$ is typically about ½ inch to about ⅝ inch.

Figure 3:
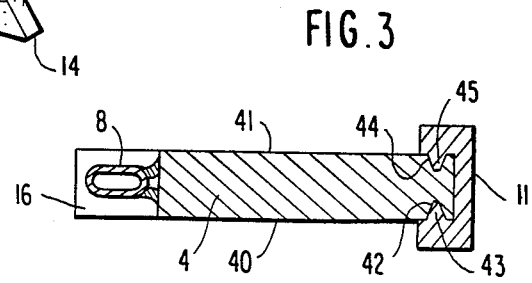
FIG. 3 shows one mode of securing an abrasion resistant material to the fertilizer knife.

Another mode of securing abrasion resistant material to the soil-breaking segment 6 is shown in FIG. 3. Blade 4 has side surfaces 40 and 41 provided with symmetrically arranged elongated V-shaped grooves 42 and 44 for receiving corresponding V-shaped projections 43 and 45 integrally formed in abrasion resistant material 11. This tongue-in-groove arrangement facilitates knife manufacture when a substantially straight blade or a blade with a substantially straight soil-breaking segment is employed. In this event, the grooves 42 and 44 will be straight making it possible to easily slide elongated, straight V-shaped projections 43 and 45 into the grooves.

As shown in FIG. 1, the fertilizer conduit 8 has a fertilizer discharge opening 17 that terminates above the surface 16 of shoulder 15 to provide an open space 18 into which the fertilizer can freely flow. It has been discovered that the fertilizer should not be directed toward the vertical sidewalls of the furrow otherwise fertilizer escapes from the furrow. This is apparently caused by compression of vapor between the sidewalls and the knife, and when the pressure is released, vapor escapes in visible clouds from the furrow. Alternate compression and depressurization of fertilizer vapor can occur, for example, as the blade rocks from side-to-side during normal operation as it moves through the furrow. It has been discovered that loss of fertilizer from the furrow can be greatly diminished by discharging the fertilizer from the conduit 8 into the open space 18 and allowing the fertilizer to flow freely into the furrow away from the trailing edge 7 of the knife and away from the sidewalls of the furrow.

The shoulder 15 performs several functions. The top surface 16 of shoulder 15 forms an angle of about 90° or more with the trailing edge 7 to prevent fertilizer from being directed toward the trailing edge. While compression of fertilizer vapor around the knife is prevented by the open space 18, the top surface 16 thus aids in directing fertilizer from the discharge opening 17 into the furrow behind the knife.

In addition, a build-up of back pressure in the fertilizer conduit 8 can occur if soil and foreign objects are allowed to pass near the discharge opening 17. When the back pressure in the fertilizer conduit 8 is relieved, there is a surge of vapor into the furrow accompanied by a loss of vapor from the furrow because the vapor cannot be fully absorbed by the soil during and shortly after the period of the surge. In order to obviate this problem, the width of top surface 16 of shoulder 15 is greater thean the width $W_2$ of the conduit 8 (see, e.g. FIG. 2). Also, the shoulder preferably extends rearwardly beyond the conduit 8. This prevents dirt and foreign objects from passing near the discharge opening 17.

Also, shoulder 15 shields the discharge opening 17 of fertilizer conduit 8 and prevents the discharge opening from becoming plugged with soil and thereby rendered inoperable. Finally, shoulder 15 also protects the fertilizer conduit 8 and its discharge opening 17 from hard objects, such as roots and stones, that may cause mechanical damage to the conduit and thereby obstruct fertilizer flow.

Movement of the knife 1 through the soil creates a furrow into which the anhydrous ammonia is continuously applied beneath the surface of the ground. Because the furrow has a narrow width and because the flat soil breaking segment maintains the soil in a loose condition, the furrow is filled as the soil falls behind the knife as the knife is moved forward. This prevents the vaporized anhydrous ammonia from escaping from the furrow behind the knife. In addition, a low ridge of loose soil may be formed on the surface of the ground on each side of the furrow as the furrow is dug. The escape of anhydrous ammonia vapor from below the surface of the ground can be further prevented by displacing the soil from the ridges into the furrow and packing the displaced soil as follows.

Soil-sealing attachments, such as wing sealers, for fertilizer applicator knives are known in the art. However, the sealer attachment of this invention is of unique design and novel placement on the knife. FIG. 4 is an elevation view of a fertilizer knife of the invention fitted with a soil sealer 19. FIG. 5 is a top view of soil sealer 19. Referring to FIG. 4, soil sealer 19 is substantially flat and has a generally trapezoidal shape when viewed from the top. The sealer 19 is provided with an opening 21 in the front edge 22. The opening 21 is of generally U-shape and has a slightly larger width than the width $W_2$ of fertilizer conduit 8 on knife 1.

Referring to FIG. 4, a generally U-shaped rigid bracket 24 is attached to the blade 4 of knife 1 by suitable means, such as a fillet weld 25 on each side of the blade 4. The soil sealer 19 is installed below the bracket 24 so that the opening 21 of the sealer straddles the fertilizer conduit 8. A stove bolt 26 passes through a centrally located hole 20 in the sealer 19 (see FIG. 5)

and is secured by a nut 27 to the bracket 24. The soil sealer 19 is thus removably attached to the fertilizer knife 1 and can be readily replaced when it becomes worn.

Several advantageous features of the soil sealer of this invention are apparent from the Figures and the following discussion. The U-shaped bracket 24 is only slightly wider than the blade 4 of knife 1. Thus, bracket 24 does not perform a sealing function. The rear edge 23 of the sealer 19 (see FIG. 5), however, is just wide enough to contact the tops of the soil ridges on each side of the furrow. Because the knife 1 has a very narrow width, it becomes apparent that the rear edge 23 is of relatively small dimension, and accordingly, the sealer 19 has a small mass. It has been discovered that the width of the rear edge 23 can be reduced by as much as 50% compared to conventional wing sealers. Conventional wing sealers are usually about 3 inches wide whereas the soil sealer of the invention is only about 1½ inches wide. These features reduce drag forces as the tool is pulled through the soil.

In addition, it will be apparent from FIG. 4 that the soil sealer 19 is located aft of the blade 4. This further reduces the drag forces as the fertilizer knife is pulled through the soil.

It has been discovered that drag can be further reduced by tilting the soil sealer 19 so that the rear edge 23 of the sealer is closer to the surface of the soil than the front edge 22 when the fertilizer knife is in use. The soil sealer 19 thereby forms an angle with the horizontal when the knife is in operating position. This angle is about 15° to about 20°, preferably about 15°.

Also, placement of the soil sealer as shown prevents premature filling of the furrow with soil before the free flowing anhydrous ammonia has cleared the discharge 17 of fertilizer tube 8 and the open space 18 between the fertilizer conduit and shoulder 15. Thus, placement of the soil sealer 19 as described minimizes the likelihood that the fertilizer conduit 8 will become plugged with soil; the discharge 17 of the conduit 8 is always forward of the area where filling of the furrow by the sealer takes place.

If the rear edge 23 of the soil sealer 19 strikes a rigid object in the soil, an upward force will be exerted on the sealer and will have the tendency to create a clockwise bending moment about the longitudinal axis of bolt 26. The soil sealer may be permanently bent, which may adversely affect its furrow filling function. Soil sealer 19 can be provided with additional support, such as a triangular flange 28 secured on either side by a fillet weld 29 to the fertilizer conduit 8 as shown in FIG. 4. Flange 28 restricts downward movement of the front edge 22 of the sealer 19.

Another means for counteracting the bending moment that results when the rear edge 23 of the sealer 19 strikes a rigid object is shown in FIG. 6. Instead of the flange member 28 of FIG. 4, the U-shaped bracket 24 is provided with an enlarged landing cut 30 to accommodate another nut 32 secured to a second stove bolt 31 passing through another hole 33 (see FIG. 5) in soil sealer 19. Once again, soil sealer 19 can be readily removed and replaced by removing the bolts and nuts 26, 27, 31 and 32 and installing a new sealer.

In another embodiment of this invention, the soil sealer 19 can be removed from the fertilizer knife shown in FIG. 4 and a segment of log chain (not illustrated) can be attached to bracket 24 on knife 1 using the bolt 26 and nut 27. The furrow will be filled in as the log chain is dragged behind the fertilizer knife.

In the fertilizer knife depicted in FIGS. 1, 4 and 6, the fertilizer conduit 8 is secured to the blade 4 by butt welds 9 and 10. The fertilizer conduit can be removed and replaced by cutting the welds, removing any excess weld material from the blade 4, providing a new fertilizer conduit and welding the conduit to the blade. An embodiment for more easily replacing the fertilizer conduit is shown in FIG. 7.

Figure 7:
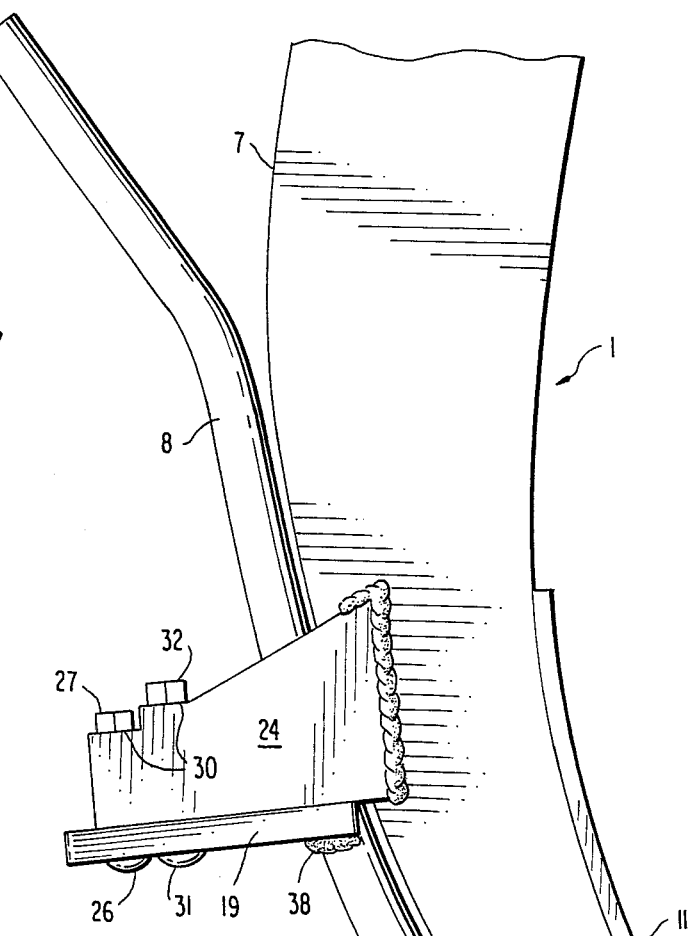
FIG. 7 shows a fertilizer knife of the invention with a removable fertilizer conduit.

The fertilizer knife 1 of FIG. 7 is provided with a fertilizer conduit 8 that is dimensioned to form a tight, friction-fit inside the U-shaped bracket 24. The central portion of the conduit 8 is thereby laterally supported by contact with the legs of the bracket 24. Movember of conduit 8 is restricted at the discharge opening 17 by a rigid pin 35 projecting upwardly from the top surface 16 of the shoulder 15 into the conduit 8.

As shown in FIG. 7, the pin 35 is secured to the top surface 16 by fillet weld 36. In a preferred embodiment the pin 35 is integrally formed with the top surface 16 of shoulder 15 by heating the blade 4 to soften the blade, and then forming a flattened pin with a die. The rigid pin 35 should be of sufficient strength to withstand forces laterally exerted on the conduit 8 and forces tending to move the discharge opening 17 angularly away from the trailing edge 7. Pin 35 should be of sufficiently small size that the flow of anhydrous ammonia through the conduit is not obstructed. In an alternate embodiment, the bottom end of the conduit 8 near the discharge opening 17 can be enlarged to ensure unobstructed flow of fertilizer. The rear of fertilizer conduit 8 can also be provided with a rearwardly directed aperture 39 to further ensure the free flow of fertilizer away from the sidewalls of the furrow and to ensure free flow of fertilizer out of the conduit and into the furrow.

Movement of fertilizer conduit 8 of FIG. 7 is prevented by securing conduit 8, such as by weld 38, to soil sealer 19, which is removably attached to bracket 24 with bolts and nuts 26, 27, 31 and 32. The landing cuts 30 of bracket 24 can be stepped as shown in FIG. 7 to facilitate removal of nuts 27 and 32 with a wrench. Thus, in addition to filling the furrow with soil, the soil sealer 19 locks the fertilizer conduit in place on the knife 1.

Fertilizer conduit 8 shown in FIG. 7 can be easily removed from the knife and replaced as follows. Bolts and nuts 26, 27, 31 and 32 are removed from soil sealer 19 and bracket 24. The soil sealer 19 and attached conduit 8 are tilted to disengage pin 35 from opening 17 of conduit 8. The conduit 8 is then pulled downward until the conduit clears the U-shaped opening of bracket 24. Another soil sealer-fertilizer conduit assembly can then be installed by reversing this process.

The fertilizer knife can also be provided with a replaceable wing sealer 19, wherein the wing sealer is rigidly secured to bracket 24, but bracket 24 is removably secured to blade 4. Fertilizer conduit 8 can then be rigidly secured to the wing sealer 19 as described in FIG. 7 or to the blade 4 as shown in FIG. 1. The bracket can be secured to the blade 4 by providing aligned holes in bracket 24 and blade 4 and inserting a roll pin in each hole to form a secure, compression fit. The roll pin can be readily disengaged from the blade with a punch and the bracket and wing sealer can then be removed and replaced. This embodiment makes it possible to standardize blade design and to fit the standard blade with different fertilizer conduit and wing sealer assemblies.

The fertilizer conduit 8 shown in FIGS. 1 and 2 has an oval cross-section formed by flattening a round tube. Flattening the conduit in this manner makes it possible to reduce its width $W_2$ sufficiently to be protected by the width of the hardened metal layer 11 and blade 4 while providing sufficient cross-sectional area for the free flow of fertilizer.

Figure 8:
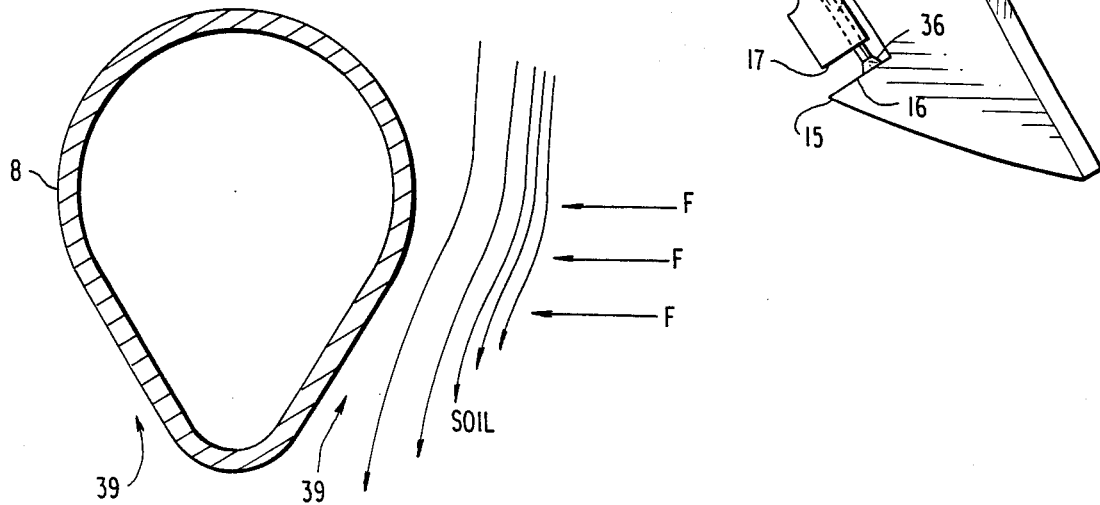
FIG. 8 shows an alternate embodiment of the cross-section of the fertilizer tube.

Another embodiment of the fertilizer conduit is shown in FIG. 8 in which the cross-section has a teardrop shape. As the knife passes through the soil, horizontally directed forces F are exerted by the sidewalls of the furrow against the sides of the blade 4. These forces are eventually exerted against the sidewalls of the fertilizer conduit 8 as the knife passes through the furrow. By providing a fertilizer conduit having a teardrop shaped cross-section, an area of relief is provided for these forces. This area of relief is generally designated as 39 in FIG. 8. When the forces exerted by the soil are relieved in this manner, there will be less force on the fertilizer conduit 8, and subsequently less wear. In either case, the width $W_2$ at its largest measurement is typically about 5/16 inch to about ⅜ inch.

It will be readily apparent from the foregoing description that at least some of the surfaces of the fertilizer knife contact the soil when in use. The soil contacting surfaces of the knife of this invention are covered by a dried, abrasion-resistant coating. The coating is applied by cladding the coating on the fertilizer knife. The coating is preferably applied from the bottom of the knife to a location above the soil sealer. One of the preferred coatings is Dura-Face alloy, a powder-like coating layer of an alloy containing nickel, chromium and silicates, manufactured by Ingersall Products Division of Borg Warner Corporation. The Dura-Face alloy coating has been found to greatly extend the operating life of the fertilizer knife before reconditioning is required.

In summary, this invention provides a fertilizer applicator knife capable of fulfilling the requirements of use with fluid fertilizers, such as anhydrous ammonia. The fertilizer knife is designed to ensure absorption of the anhydrous ammonia in the soil without the escape of vapor from the furrow. The fertilizer knife is resistant to wear on all its operating surfaces and is capable of being reconditioned quickly and easily by removing and replacing or restoring worn surfaces. Substantially all the fertilizer can be directed away from the vertical walls of the furrow.

What is claimed is:

1. A fertilizer knife for subsurface application of fertilizer in liquid or vapor form in a ground furrow, said knife comprising:
    narrow, elongated blade means having a width $W_1$, a leading edge with a soil breaking segment and a trailing edge;
    an elongated, hollow, fertilizer conduit means having a width $W_2$, wherein said conduit means is behind the trailing edge and is shaped to correspond to the trailing edge;
    a foot portion on said blade means having a bottom edge extending from the leading edge upwardly toward and beyond said trailing edge to form a rearwardly extending shoulder means therewith, wherein the shoulder means has an upwardly facing top surface that forms an obtuse angle with the vertical when the knife is in operating position;
    wherein said conduit means terminates above and is spaced from said shoulder means to prevent back pressure in said conduit during movement of the knife through the furrow and to direct flow of fertilizer away from vertical walls of said furrow;
    pieces of hard, abrasion-resistant material rigidly secured to and covering said soil-breaking segment forming a substantially flat surface generally perpendicular to the direction of travel having a width $W_3$ on the leading edge;
    soil contacting surfaces rearwardly of said inserts on said blade and conduit, wherein the soil contacting surfaces are covered by a dried, abrasion-resistant coating;
    and wherein $W_1 \geq W_2$ and $W_3 > W_1$.

2. Fertilizer knife according to claim 1 wherein said blade means comprises a rigid shank of substantially uniform thickness.

3. Fertilizer knife according to claim 2 wherein said abrasion-resistant material is comprised of tungsten carbide.

4. Fertilizer knife according to claim 1 wherein said fertilizer conduit has a rear wall and a discharge opening with an aperture in said rear wall proximate the discharge opening to ensure flow of fertilizer into said furrow and away from sidewalls of a furrow formed by said knife.

5. Fertilizer knife according to claim 1 wherein said flat surface over the soil-breaking segment is formed from a multiplicity of pieces of non-flexible metal rigidly secured to the soil-breaking segment.

6. Fertilizer knife according to claim 5 wherein said pieces are comprised of rigid metal and each piece has substantially same dimensions as other pieces.

7. Fertilizer knife according to claim 6 wherein said rigid metal is tungsten carbide.

8. Fertilizer knife according to claim 5 wherein each of said pieces is secured to said blade by a fused bead of solder between the rear of each piece and each side of said blade and width $W_3$ is sufficiently large to protect each of said beads from abrasion by soil.

9. Fertilizer knife according to claim 1 wherein said top surface is substantially flat.

10. Fertilizer knife according to claim 9 wherein said shoulder means has an upwardly facing top surface that forms an angle of about 90° or more with the trailing edge.

11. Fertilizer knife according to claim 1 wherein $W_3 > W_1$, and $W_1 > W_2$ and said widths are dimensioned to minimize soil abrasion on sidewalls of said fertilizer conduit.

12. Fertilizer knife according to claim 1 wherein said shoulder means has a width that is greater than the width $W_2$ of said fertilizer conduit.

13. Fertilizer knife according to claim 1 wherein a soil sealer of generally trapezoidal shape is rigidly secured aft of said blade means, said soil sealer having a front edge with a U-shaped opening therein, and wherein said fertilizer conduit passes through said opening.

14. Fertilizer knife according to claim 13 wherein said soil sealer has a rear edge and said rear edge is lower than the front edge of the sealer when the knife is in operating position.

15. Fertilizer knife according to claim 14 wherein the soil sealer forms an angle of about 15° to about 20° with the horizontal when the knife is in operating position.

16. Fertilizer knife according to claim 13 wherein said rear edge of the soil sealer is aft of the termination of said fertilizer conduit.

17. Fertilizer knife according to claim 13 wherein said soil sealer is removably secured to said knife.

18. Fertilizer knife according to claim 17 wherein said fertilizer conduit is rigidly secured to said wing sealer.

19. Fertilizer knife according to claim 18 wherein a rigid pin means projects from said shoulder into said fertilizer conduit for restricting movement of said conduit.

20. Fertilizer knife according to claim 1 wherein said fertilizer conduit has a substantially oval cross-section.

21. Fertilizer knife according to claim 1 wherein said fertilizer conduit has a teardrop shaped cross-section.

22. A method for fertilizing soil comprising
forming a furrow in the soil by moving the fertilizer knife of claim 1 through the soil;
feeding fertilizer in liquid or vapor form through said fertilizer conduit into said furrow; and
closing said furrow to prevent escape of fertilizer therefrom.

23. Method according to claim 22 wherein said fertilizer consists essentially of anhydrous ammonia.

* * * * *